(12) United States Patent
Tanaka (10) Patent No.: US 9,274,565 B2
(45) Date of Patent: Mar. 1, 2016

(54) HINGE DEVICE AND ELECTRONIC APPARATUS USING THAT HINGE DEVICE

(71) Applicant: FUJITSU LIMITED, Kawasaki-shi, Kanagawa (JP)

(72) Inventor: Kaigo Tanaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 462 days.

(21) Appl. No.: 13/930,804

(22) Filed: Jun. 28, 2013

(65) Prior Publication Data

US 2014/0036423 A1  Feb. 6, 2014

(30) Foreign Application Priority Data

Jul. 31, 2012 (JP) ................................. 2012-169585

(51) Int. Cl.
*G06F 1/16* (2006.01)

(52) U.S. Cl.
CPC ................ *G06F 1/1681* (2013.01); *G06F 1/16* (2013.01); *Y10T 16/533* (2015.01)

(58) Field of Classification Search
USPC ....................................... 361/679.02, 679.27
IPC ............................................. G06F 1/16,1/1681
See application file for complete search history.

(56) References Cited

U.S. PATENT DOCUMENTS

| | | | | |
|---|---|---|---|---|
| 6,115,886 A * | 9/2000 | Fujita | ...... | G06F 1/1616 16/284 |
| 6,175,990 B1 * | 1/2001 | Kato | ...... | G06F 1/1616 16/303 |
| 8,625,267 B2 * | 1/2014 | Duan | ...... | H04M 1/0216 16/303 |
| 9,021,658 B1 * | 5/2015 | Yang | ...... | G06F 1/1681 16/366 |
| 2004/0134031 A1 * | 7/2004 | Nishihara | ...... | G06F 1/1616 16/341 |
| 2005/0044663 A1 * | 3/2005 | Wu | ...... | G06F 1/1681 16/280 |
| 2005/0050687 A1 * | 3/2005 | Shiba | ...... | G06F 1/1616 16/367 |
| 2005/0055806 A1 * | 3/2005 | Shiba | ...... | G06F 1/1616 16/341 |
| 2006/0032020 A1 * | 2/2006 | Duan | ...... | G06F 1/1616 16/288 |
| 2006/0048337 A1 * | 3/2006 | Lowry | ...... | E05C 17/64 16/342 |
| 2007/0089270 A1 * | 4/2007 | Chang | ...... | E05D 5/06 16/285 |
| 2009/0217486 A1 * | 9/2009 | Itakura | ...... | G06F 1/1616 16/334 |
| 2010/0026854 A1 * | 2/2010 | Rodriguez | ...... | H04N 1/195 348/240.99 |
| 2012/0036679 A1 * | 2/2012 | Chen | ...... | E05D 11/084 16/284 |
| 2012/0102675 A1 * | 5/2012 | Lee | ...... | G06F 1/1681 16/243 |
| 2013/0044422 A1 * | 2/2013 | Li | ...... | G06F 1/162 361/679.08 |
| 2013/0119842 A1 * | 5/2013 | Tzeng | ...... | H05K 5/0226 312/325 |

(Continued)

FOREIGN PATENT DOCUMENTS

| | | |
|---|---|---|
| JP | 1993-150224 | 6/1993 |
| JP | 2008-250635 | 10/2008 |

(Continued)

*Primary Examiner* — David Warren
(74) *Attorney, Agent, or Firm* — Fujitsu Patent Center (57) ABSTRACT

A hinge device which rotatably connects a display to a keyboard part comprised of a hinge pivot member which attaches the keyboard part and a bracket which is attached to the display and holds the hinge pivot member and of a hinge cover, wherein if making the bracket hold the hinge pivot member, then attaching the hinge cover to the pivot of the hinge pivot member and making it slide in the axial direction to engage it with the housing of the display part and attaching the front cover to the display part in this state, a projecting part which is provided at the front end part of the front cover is inserted in the hinge cover and return of the hinge cover in the axial direction is prevented, so the front cover and hinge cover can be simply removed at the time of maintenance of the display part.

20 Claims, 10 Drawing Sheets

(56) References Cited

U.S. PATENT DOCUMENTS

| | | | | |
|---|---|---|---|---|
| 2013/0170122 A1* | 7/2013 | Lai | ............................ | G06F 1/16 361/679.6 |
| 2013/0175914 A1* | 7/2013 | Lin | ........................ | G06F 1/1681 312/327 |
| 2013/0182403 A1* | 7/2013 | Yang | ..................... | G06F 1/1681 361/809 |
| 2013/0308262 A1* | 11/2013 | Chang | ................... | H05K 5/0226 361/679.09 |
| 2013/0318746 A1* | 12/2013 | Kuramochi | ............ | G06F 1/1681 16/342 |
| 2013/0342974 A1* | 12/2013 | Hung | ..................... | G06F 1/1681 361/679.01 |
| 2014/0007379 A1* | 1/2014 | Yang | ..................... | G06F 1/1681 16/277 |
| 2014/0016250 A1* | 1/2014 | Fujita | ................... | H05K 5/0226 361/679.01 |
| 2014/0036423 A1* | 2/2014 | Tanaka | .................. | G06F 1/1681 361/679.01 |
| 2014/0047672 A1* | 2/2014 | Saito | ..................... | G06F 1/1681 16/341 |
| 2014/0063750 A1* | 3/2014 | Mau | ....................... | G06F 1/1601 361/728 |
| 2014/0126134 A1* | 5/2014 | Hsu | ........................ | G06F 1/1616 361/679.27 |
| 2014/0165334 A1* | 6/2014 | Liu | ......................... | G06F 1/1613 16/337 |
| 2014/0331452 A1* | 11/2014 | Zhang | ........................ | G06F 1/16 16/337 |
| 2014/0352113 A1* | 12/2014 | Chen | ..................... | H04M 1/022 16/366 |
| 2015/0007416 A1* | 1/2015 | Chen | ..................... | G06F 1/1681 16/386 |
| 2015/0009614 A1* | 1/2015 | Tsai | ...................... | G06F 1/1681 361/679.27 |
| 2015/0089770 A1* | 4/2015 | Liang | ........................ | G06F 1/16 16/386 |
| 2015/0098175 A1* | 4/2015 | Hsu | ........................ | E05D 11/082 361/679.27 |
| 2015/0121654 A1* | 5/2015 | Novin | ....................... | E05D 3/02 16/273 |

FOREIGN PATENT DOCUMENTS

| | | |
|---|---|---|
| JP | 2011-58607 | 3/2011 |
| WO | WO-2011/030631 | 3/2011 |

* cited by examiner

HINGE DEVICE AND ELECTRONIC APPARATUS USING THAT HINGE DEVICE

CROSS-REFERENCE TO RELATED APPLICATION

This application claims priority from, and incorporates by reference the entire disclosure of, Japanese Patent Application No. 2012-169585, filed on Jul. 31, 2012.

FIELD

The present application relates to a hinge device which is used for opening and closing a housing of a display part with respect a housing of a keyboard part and to an electronic apparatus which uses the hinge device.

BACKGROUND

In a notebook PC or other such electronic apparatus which is provided with a keyboard part and a display part, the housing of the display part is connected to the housing of the keyboard part to be able to open and close by a hinge device. The hinge device is provided at a part forming the axis of opening/closing of the two housings (see Japanese Laid-Open Patent Publication No. 2011-58607 and Japanese Laid-Open Patent Publication No. 2008-250635). Further, when the electronic apparatus is not being used, the hinge device is used to close the display part and lay it flat over the keyboard part thereby enabling the electronic apparatus to be made more compact.

A hinge device in general is provided with a bracket which is attached to one housing and a pivot which is attached to the other housing and is designed so that the bracket holds the pivot in a rotatable manner. In an electronic apparatus which is provided with a keyboard part and a display part, the pivot can be made to turn with respect to the bracket so as to open or close the display part with respect to the keyboard part. This hinge device is a part which stands out in the appearance of an electronic apparatus, so a hinge cover is used to cover the hinge device and maintain a beautiful design and to prevent injury due to mistaken insertion of a finger into the hinge device. Various ideas are used to improve the method of installation of the cover for covering the hinge device.

Among these, there is the technique of arranging the pivot itself of the hinge device at the outside of a side surface of the far side of the housing of the keyboard part of the electronic apparatus to conceal the hinge device from the side which opens and closes the display part and thereby make the hinge device invisible to the user. In this regard, even if employing this technique, the hinge device is exposed at the outside of the side surface at the far side of the housing of the keyboard part of the electronic apparatus. For this reason, when the user puts his hand at the back side of the keyboard part of the electronic apparatus, he might mistakenly insert a finger in the hinge device. To prevent this, a hinge cover which covers the hinge device is necessary. On the other hand, in a structure which conceals the hinge device at the far side of the housing of the keyboard part of the electronic apparatus, the structure for connecting the display part to the hinge device becomes complicated and the hinge cover member also becomes complex.

In an electronic apparatus which employs a structure which conceals the hinge device from the side which opens and closes the display part, the hinge cover which conceals the pivot of the hinge device is provided at the far side of the housing of the keyboard part. Further, if adopting a structure in which the hinge cover is screwed to the housing of the keyboard part, the hinge cover will come off if the screws are removed. In such a structure, when performing maintenance on the display part, the screws are removed in the state with the display part closed, the display part is opened as it is, and the front cover of the display part is removed. When the display part finishes being maintained, the display part is attached to the keyboard part by assembly by the reverse procedure.

In this regard, when fastening a hinge cover by screws to the housing of the keyboard part of an electronic apparatus, the hinge cover is liable to fall off when opening and closing the apparatus. For this reason, even if possible to remove the hinge cover to detach the front cover of the display part, attaching the front cover to the display part and connecting the display part to the keyboard part become extremely difficult in terms of assembly process.

Therefore, it may be considered to fasten the hinge cover to the housing of the keyboard part of the electronic apparatus by a tab member which is provided at the hinge cover. However, when fastening a hinge cover by a tab member to a housing of a keyboard part of an electronic apparatus, there is the issue that the hinge cover will easily detach from the keyboard part when disassembling the front cover of the display part. Further, if fabricating the hinge cover so that the hinge cover does not mistakenly detach from the keyboard part during use of the electronic apparatus by the user, the structure of the hinge cover will end up becoming complicated.

SUMMARY

In one aspect, the present application has as its object to provide a hinge device which connects a keyboard part and a display part of an electronic apparatus, wherein a hinge cover will not be mistakenly detached at the time of use by a user and the hinge cover can be simply detached when detaching the front cover of the display part at the time of maintenance of the display part, and to provide an electronic apparatus which uses the hinge device.

According to one aspect, the present application provides a hinge device which is provided between a first housing and a second housing which is provided with a front cover of a display and which connects the second housing to the first housing to be able to open and close, wherein the hinge device is provided with a bracket which is provided with a first mounting part and a rotatable holding part of a pivot, the first mounting part being fastened to an end part of one of the housings, a hinge pivot member which is provided with a second mounting part and a pivot, the second mounting part being fastened to an end part of the other of the housings, the pivot being held by the rotatable holding part, and a hinge cover which is attached to the pivot of the hinge pivot member to be able to slide in its axial direction and which covers the pivot and the rotatable holding part of the bracket in a state where the pivot is held at the rotatable holding part, the hinge cover has an engagement tab which engages with the second housing to prevent the hinge cover from detaching from the pivot by the cover being slid after being attached to the pivot and a space part which opens in the direction of the second housing in the engaged state of the engagement tab, the front cover is provided with a projecting piece which is inserted into the space part if attached to the second housing when the engagement tab of the hinge cover is engaged, and the hinge cover is blocked from movement in the axial direction by the projecting piece in the state where the front cover is attached.

According to another aspect, the present application provides an electronic apparatus which uses a hinge device which is provided between a first housing and a second housing provided with a front cover of a display and which connects the second housing to the first housing to be able to be opened and closed.

DESCRIPTION OF EMBODIMENTS

Below, using the attached drawings, embodiments of the present application will be explained in detail based on specific examples.

Figure 1A:
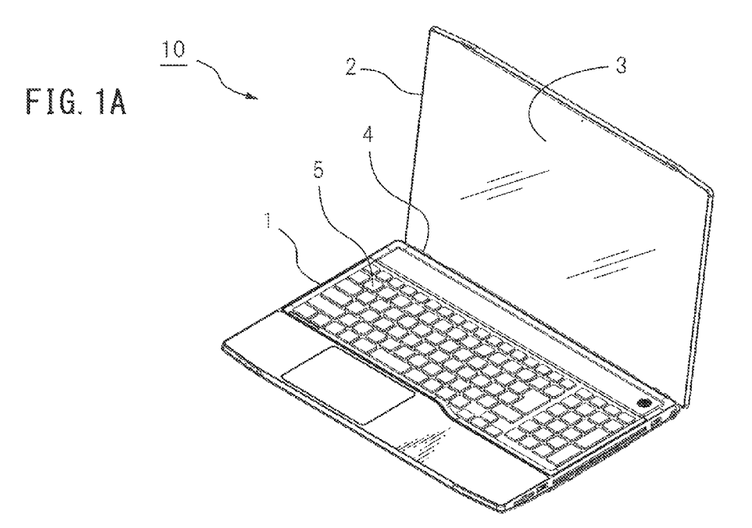
FIG. 1A is a perspective view which illustrates the appearance of an electronic apparatus which is provided with a keyboard part and a display part which are connected by a hinge device of the present application.

FIG. 1A is a perspective view which illustrates the appearance of an electronic apparatus 10 which is provided with a hinge device 4 of the present application. The electronic apparatus 10 has a keyboard part 1 which is provided with input keys 5 and a display part 2 which is provided with a display. The display part 2 has a front cover 3 which protects the display attached to it. The display part 2 can be folded over the keyboard part 1 by the hinge device 4. The hinge device 4 which is provided in the electronic apparatus 10 which is covered by the present application is at a position which is hidden from the user of the electronic apparatus 10 when opening and closing the display part 2 with respect to the keyboard part 1.

Figure 1B:
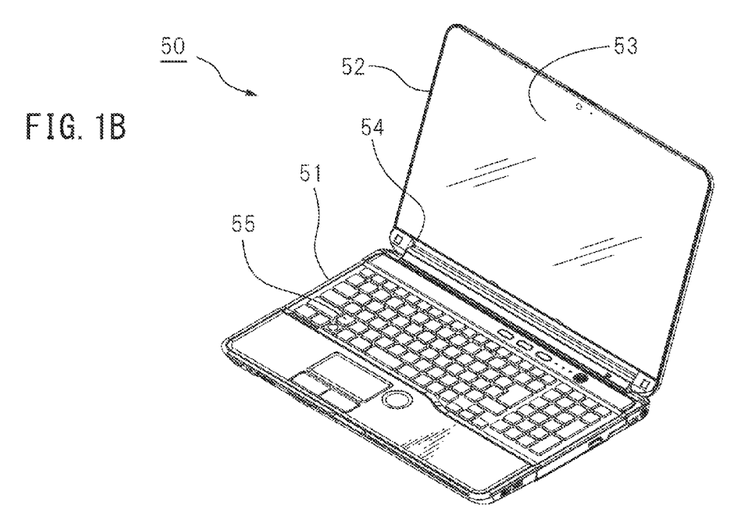
FIG. 1B is a perspective view which illustrates the appearance of an electronic apparatus which is provided with a conventional hinge device of the present application.

As opposed to this, FIG. 1B is a perspective view which illustrates the appearance of an electronic apparatus 50 which is provided with a conventional hinge device 54. The electronic apparatus 50 has a keyboard part 51 which is provided with input keys 55 and a display part 52 which is provided with a display. The display part 52 has a front cover 53 which protects the display attached to it. The display part 52 can be folded over the keyboard part 51 by the hinge device 54. In the hinge device 54 which is provided at the electronic apparatus 50, the pivot of the hinge device 54 is at the upper side of the keyboard part 51, so the hinge device 54 is provided to be visible to the user of the electronic apparatus 50.

Figures 2A, 2B:
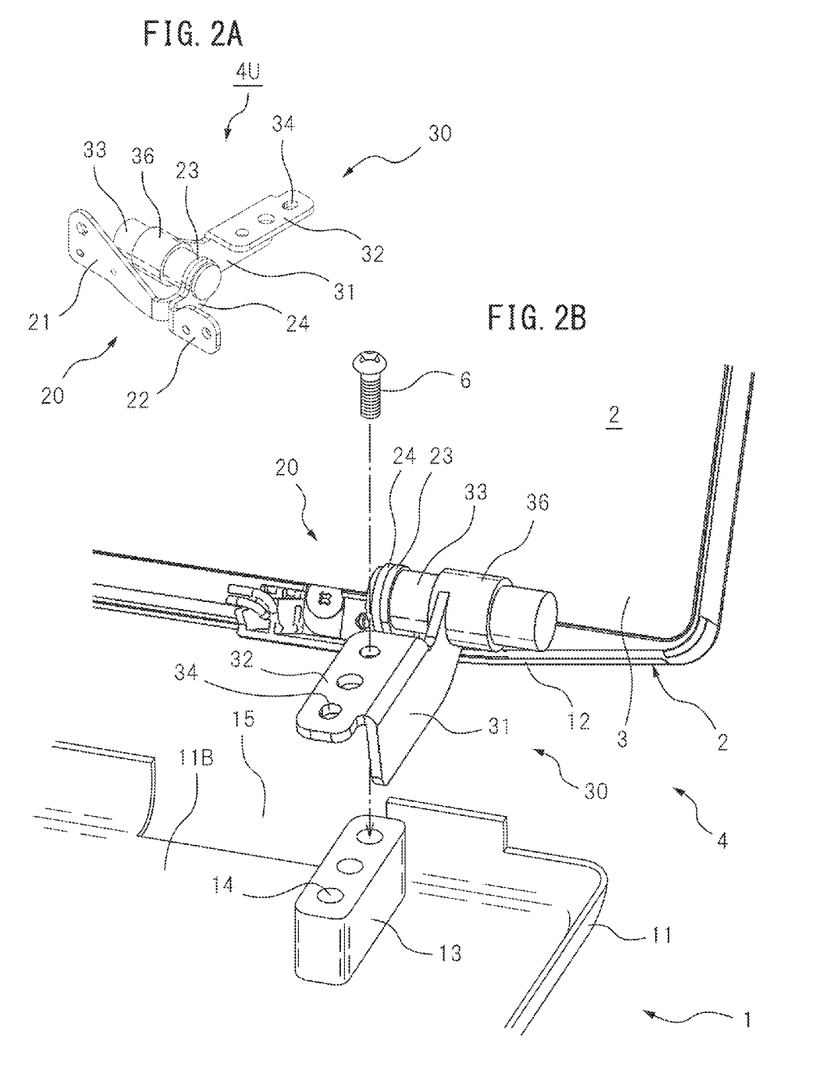
FIG. 2A is a perspective view which illustrates one example of a hinge unit which forms a hinge device of the present application.
FIG. 2B is a disassembled perspective view which illustrates an embodiment where the hinge unit which is illustrated in FIG. 2A is used to connect the display part and the keyboard part.

FIG. 2A is a perspective view which illustrates one example of a hinge unit 4U which is used as the hinge device 4 which is used in the electronic apparatus 10. The hinge unit 4U of this embodiment is provided with a bracket 20 which rotatably holds a pivot 33 and with a hinge pivot member 30 to which the pivot 33 is fastened. The bracket 20 is attached to the display part 2, while the hinge pivot member 30 is attached to the keyboard part 1. For this reason, the bracket 20 has two mounting parts 21 and 22 which are provided with mounting surfaces parallel to the pivot 33 and has rotatable holding parts 23 and 24 which are provided projecting from the mounting parts 21 and 22 and rotatably hold the pivot 33.

Further, the hinge pivot member 30 has a pivot mounting part 36 which fastens the pivot 33. This pivot mounting part 36 is provided at a front end part of an arm part 31 in a direction perpendicular to the arm part 31. A base part of the arm part 31 is bent at right angles to the arm part 31 to form the mounting part 32 to the display part 2. The mounting part 32 is provided with three through holes 34 for passing screws in this embodiment. The hinge unit 4U which is illustrated in FIG. 2A, as illustrated in FIG. 2B, is attached to the display part 2 by the two mounting parts 21 and 22.

On the other hand, the bottom surface 11B of the housing 11 of the keyboard part 1 of the electronic apparatus 10 is provided with a boss part 13 for attachment of the hinge pivot member 30. The top surface of the boss part 13 is provided with screw holes 14 to which screws may be fastened. The number of screw holes 14 is matched with the number of through holes 24 at the mounting part 32 of the bracket 20. The arm part 31 of the bracket 20 is attached to the boss part 13 along the side surface of the boss part 13. The mounting part 32 of the hinge pivot member 30 can be fastened to the boss part 13 by screwing a screw 6 which is passed through a through hole 34 to a screw hole 14 of the boss part 13.

Figure 3A:
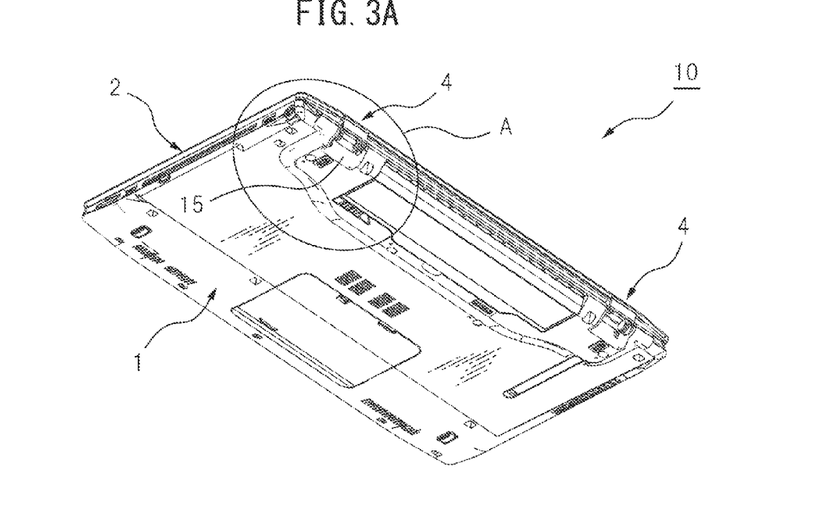
FIG. 3A is a perspective view of the electronic apparatus of FIG. 1A which is provided with the hinge device which is illustrated in FIG. 2A as seen from the bottom surface side.
Figure 3B:
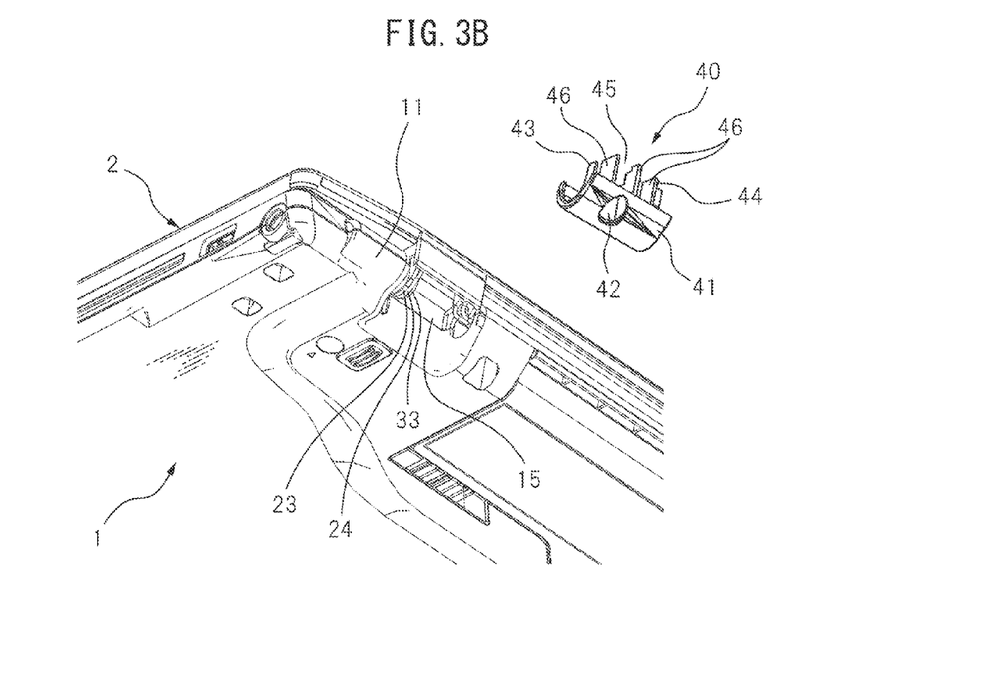
FIG. 3B is an assembled perspective view of the partially enlarged view of part A of FIG. 3A plus a hinge cover which is used for the hinge device of the present application.

FIG. 3A is a perspective view of the electronic apparatus 10 which is illustrated in FIG. 1A which is provided with the hinge device 4 which was explained in FIGS. 2A and 2B as seen from the bottom surface, while FIG. 3B is an assembled perspective view including the partially enlarged view of part A of FIG. 3A plus a hinge cover 40 which is used for the hinge device 4 of the present application. As illustrated in FIG. 3A, the single electronic apparatus 10 is provided with hinge devices 4 at two locations. In the electronic apparatus 10 to which the present application is applied, as illustrated in this figure, the hinge devices 4 are provided at the back side of the keyboard part 1 at a lower side position of the display part 2. Therefore, as illustrated in FIG. 1A, in the electronic apparatus 10 to which the present application is applied, the hinge devices 4 are not visible to the party operating the electronic apparatus 10.

On the other hand, the hinge devices 4 which are provided with the brackets 20 and hinge pivot members 30 which are explained in FIGS. 2A and 2B are at positions which are not visible to the operator of the electronic apparatus 10. However, the rotatable holding parts 22 of the brackets 20 and the pivots 33 of the hinge pivot members 30 of the hinge devices 4 are exposed at slots 15 of the housing 11. Therefore, in the hinge devices 4 of the present application, as illustrated in FIG. 3B, hinge covers 40 are attached to the slots 15 to cover the rotatable holding parts 22 of the brackets 20 and the pivots 33 of the hinge pivot members 30 and prevent the user from mistakenly touching the rotatable holding parts 22 and pivots 33. The configuration of the hinge covers 40 will be explained in detail later, but each hinge cover 40 has a blind plate 41, a circular hole 42, a pivot mounting plate 43, an engagement tab 44, a space 45, and mounting plates 46.

Figure 4A:
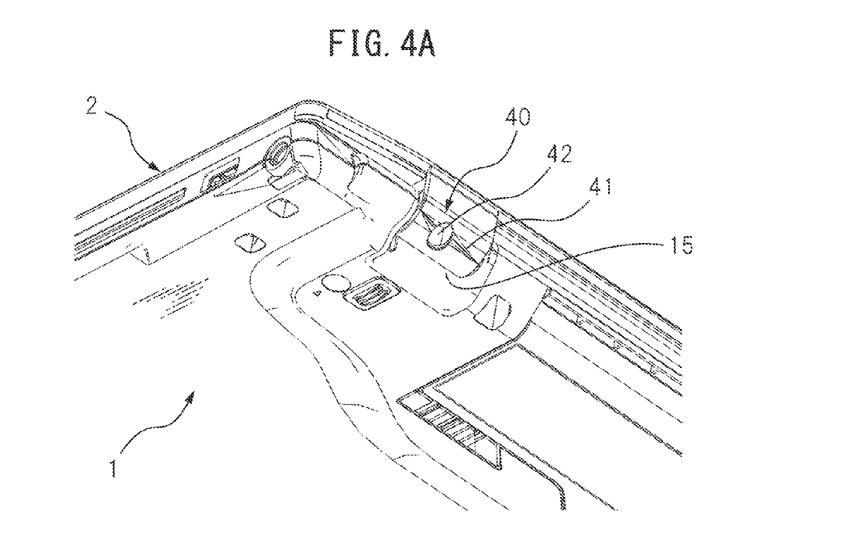
FIG. 4A is a partially enlarged perspective view which illustrates the same portion as FIG. 3B which illustrates the state of attachment of the hinge cover which is illustrated in FIG. 3B attached to the hinge device of the electronic apparatus.

FIG. 4A is a partially enlarged perspective view which illustrates the state of attachment of a hinge cover 40 which is illustrated in FIG. 3B attached to a slot 15 of the housing 11 of the keyboard part 1 to conceal the hinge device 4. In the state with the hinge cover 40 attached to the slot 15, the hinge cover 40 does not slide inside the slot 15. Further, as illustrated in FIG. 3A, the electronic apparatus 10 is provided with hinge devices 4 at two locations, so two hinge covers 40 which cover the hinge devices 4 are required.

Figure 4B:
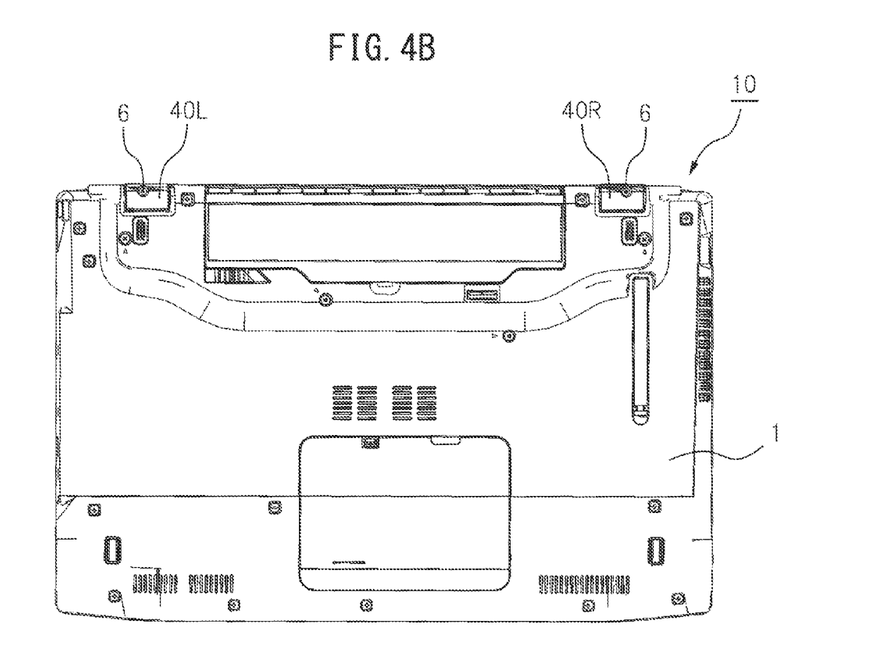
FIG. 4B is a bottom surface view of an electronic apparatus in a state where hinge covers are attached to hinge devices as seen from the bottom surface.

FIG. 4B is a bottom surface view of an electronic apparatus 10 which illustrates a state where hinge covers 40 are attached to the hinge devices 4 at two locations of the back surface of the electronic apparatus 10. The hinge covers 40 which are attached to two locations of the back surface of the electronic apparatus 10 are not the same but are symmetrical in shape to the left and right at the back surface of the electronic apparatus 10. Here, the hinge cover 40 at the left side of the back surface of the electronic apparatus 10 is referred to as the "hinge cover 40L", while the hinge cover 40 at the right side is referred to as the "hinge cover 40R". The hinge covers 40L and 40R are attached by screws 6 to the back surface of the electronic apparatus 10.

Figure 5A:
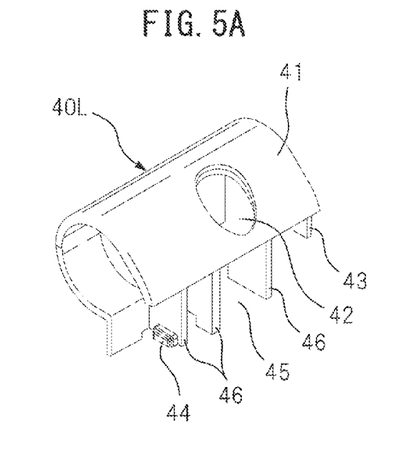
FIG. 5A is a perspective view of a hinge cover which is used at the left side of the back surface of the electronic apparatus which is illustrated in FIG. 4B as seen from the front surface.
Figure 5B:
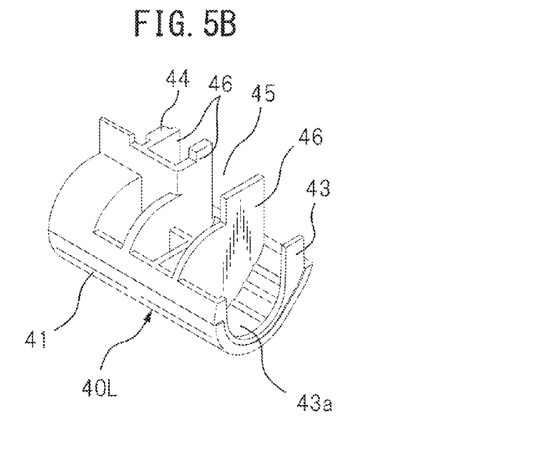
FIG. 5B is a perspective view of the hinge cover which is illustrated in FIG. 5A as seen from the back surface.
Figure 5C:
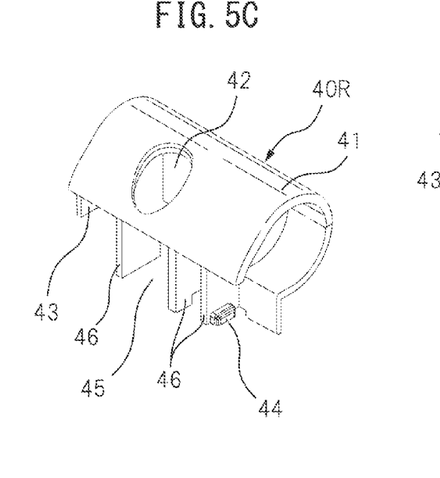
FIG. 5C is a perspective view of a hinge cover which is used at the right side of the back surface of the electronic apparatus which is illustrated in FIG. 4B as seen from the front surface.
Figure 5D:
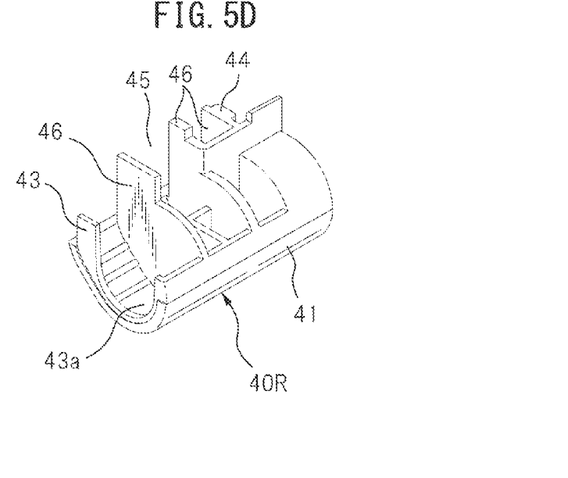
FIG. 5D is a perspective view of the hinge cover which is illustrated in FIG. 5C as seen from the back surface.

FIG. 5A is a perspective view of the hinge cover 40L which is used at the left side of the back surface of the electronic apparatus 10 which is illustrated in FIG. 4B as seen from the front surface, while FIG. 5B is a perspective view of the hinge cover 40L which is illustrated in FIG. 5A as seen from the back surface. Further, FIG. 5C is a perspective view of the hinge cover 40R which is used at the right side of the back surface of the electronic apparatus 10 which is illustrated in FIG. 4B as seen from the front surface, while FIG. 5D is a perspective view of the hinge cover 40R which is illustrated in FIG. 5C as seen from the back surface. The hinge covers 40L and 40R are just symmetric in shape to the left and right. They are configured exactly the same. Here, the hinge covers will be assigned the representative numbers "40" to explain their structures.

Each hinge cover 40 is provided with the blind plate 41, the circular hole 42 which is provided at the blind plate 41, the pivot mounting plate 43, and the plurality of mounting plates 46. The blind plate 41 is curved and covers the rotatable holding part 22, pivot 33, and slot 15 which are illustrated in FIG. 3B. Further, the pivot mounting plate 43 is attached to the pivot 33, while the plurality of mounting plates 46 are inserted into the slot 15. The pivot mounting plate 43 has a recessed part 43a into which the pivot 33 is inserted, while the mounting plates 46 are shaped similar to the cross-sectional shape of the slot 15 in the direction vertical to the longitudinal direction.

Further, at the end part of the mounting plate 46 the furthest from the pivot mounting plate 43, an engagement tab 44 is provided for engaging the hinge cover 40 with part of the housing 12 of the display part 2 to prevent it from detaching from the housing 12 of the display part 2. Furthermore, the two mounting plates 46 at the center part of the hinge cover 40 are arranged at the two sides of the circular hole 42 at the blind plate 41. Between these two mounting plates 46, a space 45 of a predetermined distance is provided. Each hinge cover 40 is made of plastic and has a total length shorter than the length of the slot 15 in the longitudinal direction by exactly a length of at least the height of the engagement tab 44 from the mounting plates 46.

Figure 6:
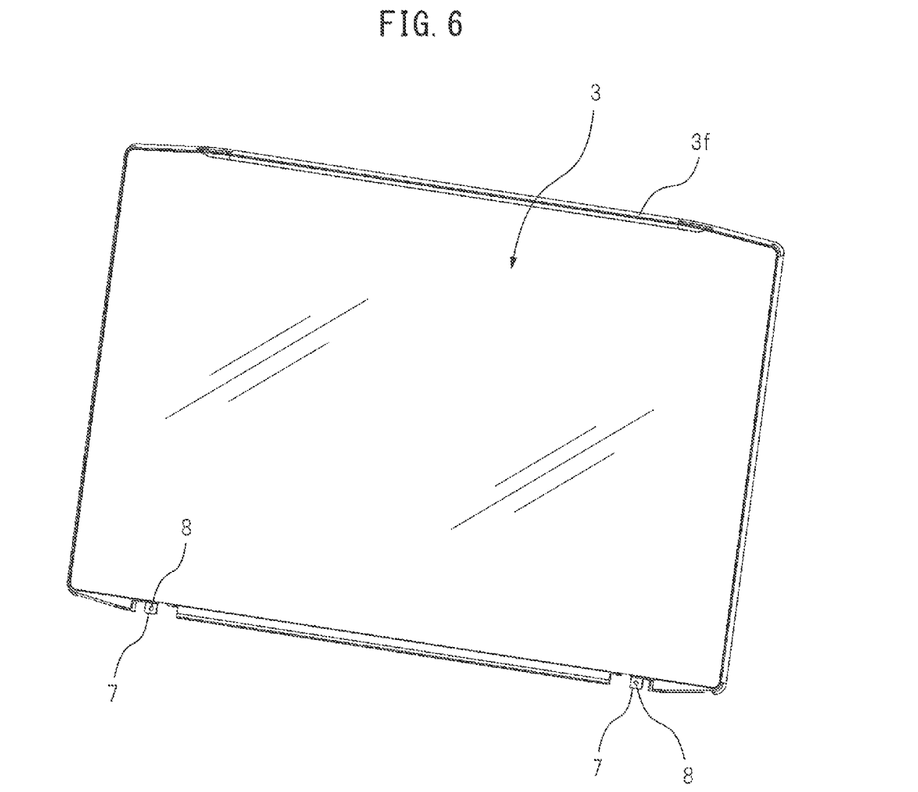
FIG. 6 is a perspective view which illustrates the structure of one embodiment of a front cover which is used for the hinge device of the present application of the electronic apparatus which is illustrated in FIG. 1A.

FIG. 6 is a perspective view of the electronic apparatus 10 which is illustrated in FIG. 1A which illustrates extracted just the front cover 3 which protects the display at the display part 2. The front cover 3 is provided with a transparent acrylic sheet or glass sheet at the inside of a frame 3f. At the bottom end part of the frame 3f, projecting pieces 7 are provided at two locations. The projecting pieces 7 are provided with through holes 8 which pass screws for attaching the front cover 3 to the display part 2. Furthermore, the widths of the projecting pieces 7 are widths which enable insertion with substantially no clearance into the space 45 at the hinge covers 40 explained in FIG. 5A to 5D.

Above, FIGS. 1A and 1B to FIG. 6 were used to explain the configuration of the hinge device 4 of the electronic apparatus 10 and configuration of the hinge cover 40 which covers the hinge device 4 and, furthermore, the configuration of the front cover 3 which is attached to the display part 2 of the electronic apparatus 10. Next, FIGS. 7A to 7C to FIGS. 10A and 10B will be used to explain the process of attaching the hinge cover 40 to a hinge device 4 which is already attached to the display part 2 and attaching the front cover 3 to the display part 2 so as to prevent the hinge cover 40 from detaching from the display part 2.

Figure 7A:
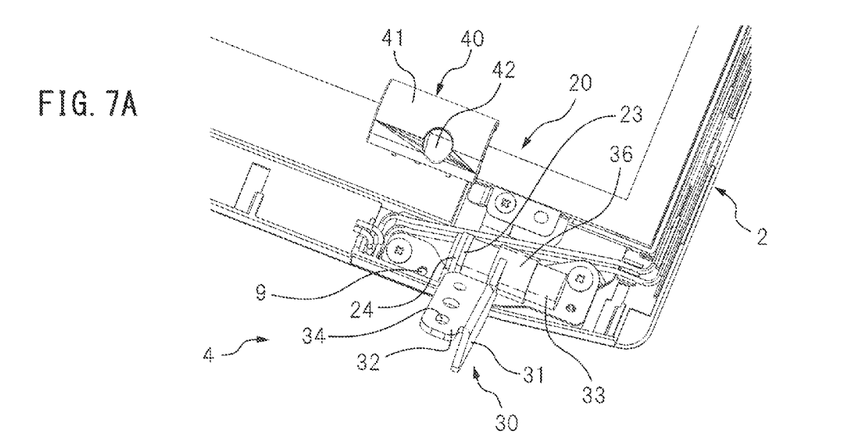
FIG. 7A is a partially enlarged perspective view which illustrates a state of a stage before a hinge cover is attached to a hinge device which is attached to a display part of the electronic apparatus which is illustrated in FIG. 1A.

FIG. 7A is a partially enlarged perspective view which illustrates the state of the stage before attaching a hinge cover 40 to a hinge device 4 which is attached to the display part 2 of the electronic apparatus 10 which is illustrated in FIG. 1A. In this state, the bracket 20 is already attached to the display part 2. The pivot 33 of the hinge pivot member 30 is rotatably held by the rotatable holding parts 23 and 24 of the bracket 20. Further, this state is the state where the hinge pivot member 30 is detached from the keyboard part of the electronic apparatus. The configuration of the hinge pivot member 30 has already been explained, so here only reference numerals will be attached to the members forming the hinge pivot member 30 and explanations will be omitted. Furthermore, reference numeral 9 which is illustrated in FIG. 7A is a screw hole which is provided at the housing 12 of the display part.

Figure 7B:
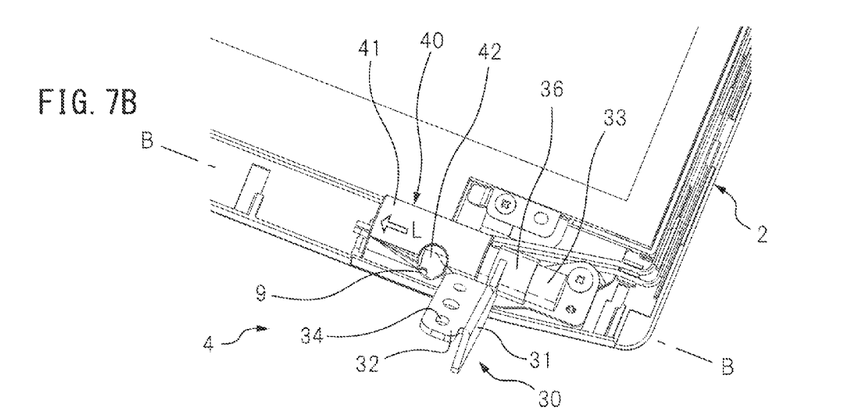
FIG. 7B is a partially enlarged perspective view which illustrates a state where the hinge cover which is illustrated in FIG. 7A is attached to the hinge device.
Figure 7C:
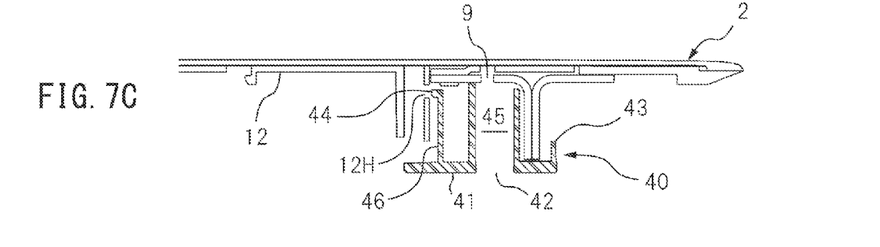
FIG. 7C is a schematic cross-sectional view which illustrates the connected state of the hinge cover and the housing of the display part along the line B-B of FIG. 7B.

FIG. 7B is a partially enlarged perspective view which illustrates the state where the hinge cover 40 which is illustrated in FIG. 7A is attached to the hinge device 4, while FIG. 7C is a schematic cross-sectional view which illustrates the connected state of the hinge cover 40 and the housing 12 of the display part along the line B-B of FIG. 7B. Note that, FIG. 7C illustrates only the positional relationship of the hinge cover 40 and the housing 12 of the display part. Illustration of the pivot 33 of the hinge device 4 is omitted. The hinge cover 40 is attached to the pivot 33 by the pivot mounting plate 43 which was explained in FIG. 5A to FIG. 5D. In this state, the screw hole 9 and the circular hole 32 of the hinge cover 40 are not centered with each other and the engagement tab 44 of the hinge cover 40 is not inserted in the engagement hole 12H at the housing 12 of the display part.

Figure 8A:
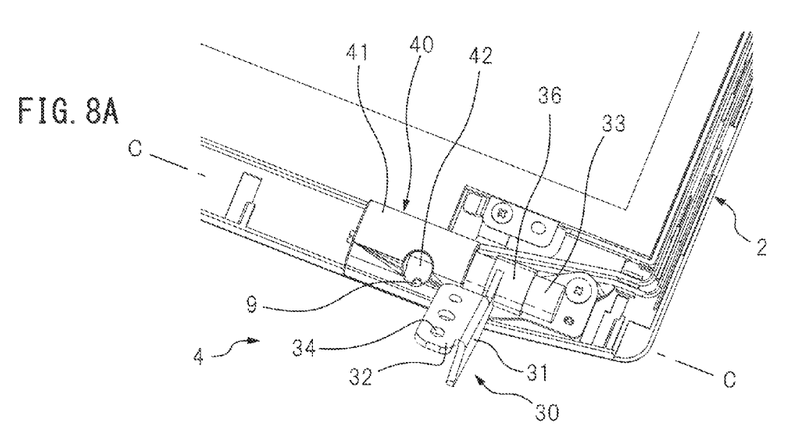
FIG. 8A is a partially enlarged perspective view which illustrates the state where the hinge cover is made to slide along the pivot of the hinge device from the state of FIG. 7B so as to engage with the housing of the display part.
Figure 8B:
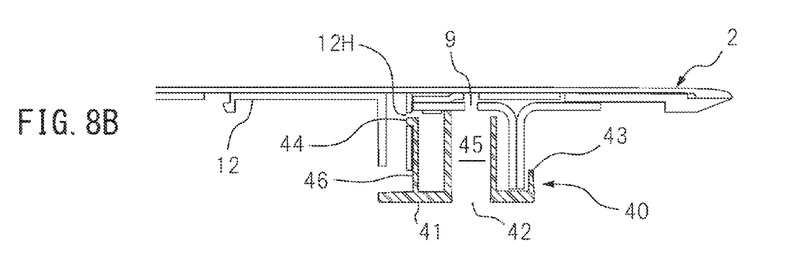
FIG. 8B is a schematic cross-sectional view which illustrates the connected state of the hinge cover and the housing of the display part along the line C-C of FIG. 8A.

FIG. 8A is a partially enlarged perspective view which illustrates the state of sliding the hinge cover 40 from the state of FIG. 7B along the pivot 33 of the hinge device 4 in the direction illustrated by the white arrow L to engage with the housing 12 of the display part. Further, FIG. 8B is a schematic cross-sectional view which illustrates the connected state of the hinge cover 40 and the housing 12 of the display part along the line C-C of FIG. 8A. FIG. 8B also illustrates only the positional relationship between the hinge cover 40 and the housing 12 of the display part. Illustration of the pivot 33 of the hinge device 4 is omitted. In this state, the screw hole 9 and the circular hole 32 of the hinge cover 40 are centered with each other and the engagement tab 44 of the hinge cover 40 is inserted in the engagement hole 12H at the housing 12 of the display part. Therefore, in this state, the hinge cover 40 is engaged with the engagement hole 12H at the housing 12 of the display part by the engagement tab 44, so will not detach.

Figure 8C:
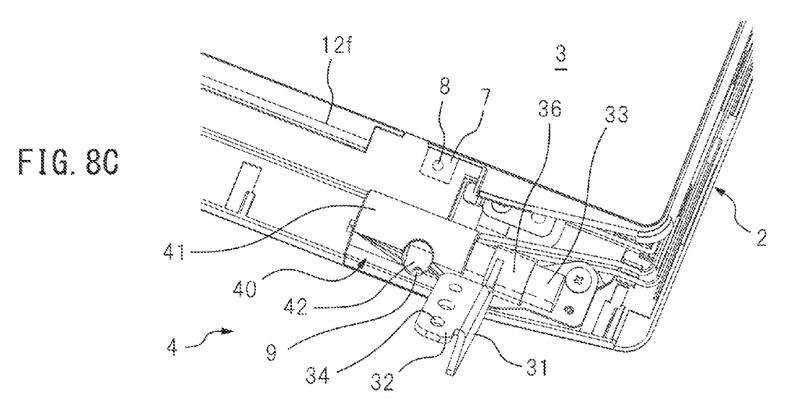
FIG. 8C is a partially enlarged assembled perspective view which illustrates the process of attaching the front cover to the display part which is illustrated in FIG. 8B.

FIG. 8C is a partially enlarged assembled perspective view which illustrates the process of attachment of the front cover 3 to the display part 2 which is illustrated in FIG. 8B. The position of a projecting piece 7 which is provided at the frame of the front cover 3 matches the position of the space 45 at the hinge cover 40 after sliding which is illustrated in FIG. 8A. Therefore, if attaching the front cover 3 to the display part 2, the projecting piece 7 is inserted into the space 45 of the hinge cover 40.

Figure 9A:
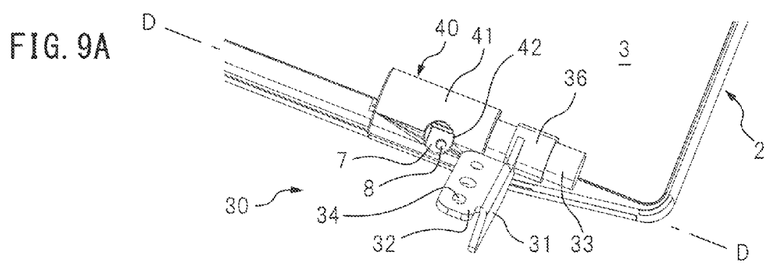
FIG. 9A is a partially enlarged perspective view which illustrates the state of attaching the front cover which is illustrated in FIG. 8C to the display part.
Figure 9B:
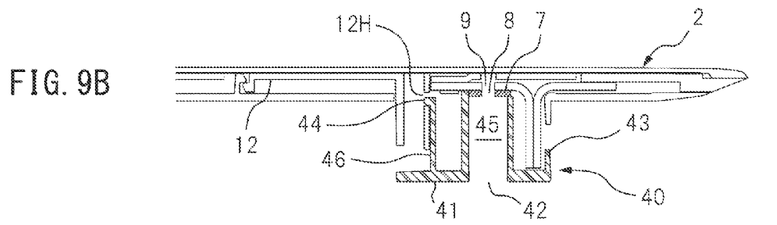
FIG. 9B is a schematic cross-sectional view which illustrates the connected state of the hinge cover and the housing of the display part along the line D-D of FIG. 9A.

FIG. 9A is a partially enlarged perspective view which illustrates the state where the front cover 3 which is illustrated in FIG. 8C is attached to the display part 2, while FIG. 9B is a schematic cross-sectional view which illustrates the connected state of the hinge cover 40 and the housing 12 of the display part along the line D-D of FIG. 9A. As explained in FIG. 6, the width of a projecting piece 7 is a width enabling insertion with substantially no clearance into the space 45 at the hinge cover 40. Further, if the projecting piece 7 is inserted into the space 45, as illustrated in FIG. 9B, the projecting piece 7 enters the space 45 with no clearance and the through hole 8 which is provided at the projecting piece 7 is aligned with the screw hole 9 which is provided at the housing 12 of the display part.

Figure 9C:
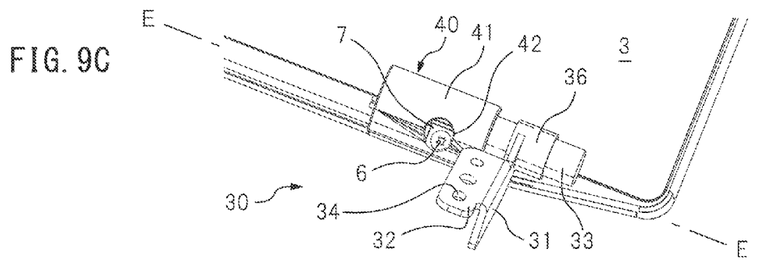
FIG. 9C is a partially enlarged perspective view which illustrates the state of fastening a screw in a through hole of a projecting piece which projects from the front cover which is illustrated in FIG. 9A and FIG. 9B.
Figure 9D:
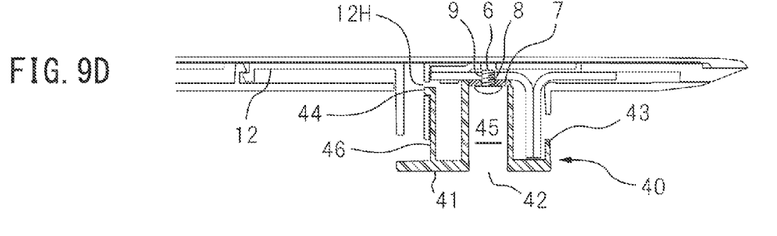
FIG. 9D is a schematic cross-sectional view which illustrates the connected state of the hinge cover and the housing of the display part along the line E-E of FIG. 9C.

FIG. 9C is a partially enlarged perspective view which illustrates the state where a screw 6 is passed through the through hole 8 of a projecting piece 7 which is provided at the front cover 3 which is illustrated in FIGS. 9A and 9B and screwed to a screw hole 9 which is provided at the housing 12 of the display part. Further, FIG. 9D is a schematic cross-sectional view which illustrates the connected state of a hinge cover 40 and the housing 12 of the display part along the line E-E of FIG. 9C. The screw 6 may be engaged with the through hole 8 of the projecting piece 7 through the circular hole 42 of the hinge cover 40 and screwed with the screw hole 9 through the circular hole 42 by a screwdriver. In this state, the screw 6 is used to prevent the front cover 3 from detaching from the housing 12 of the display part. The hinge cover 40 does not move since the projecting piece 7 enters the space 45 with no clearance. Accordingly, the hinge cover 40 is held in a state connected to the housing 12 of the display part and will not detach from the housing 12 of the display part.

Figure 10A:
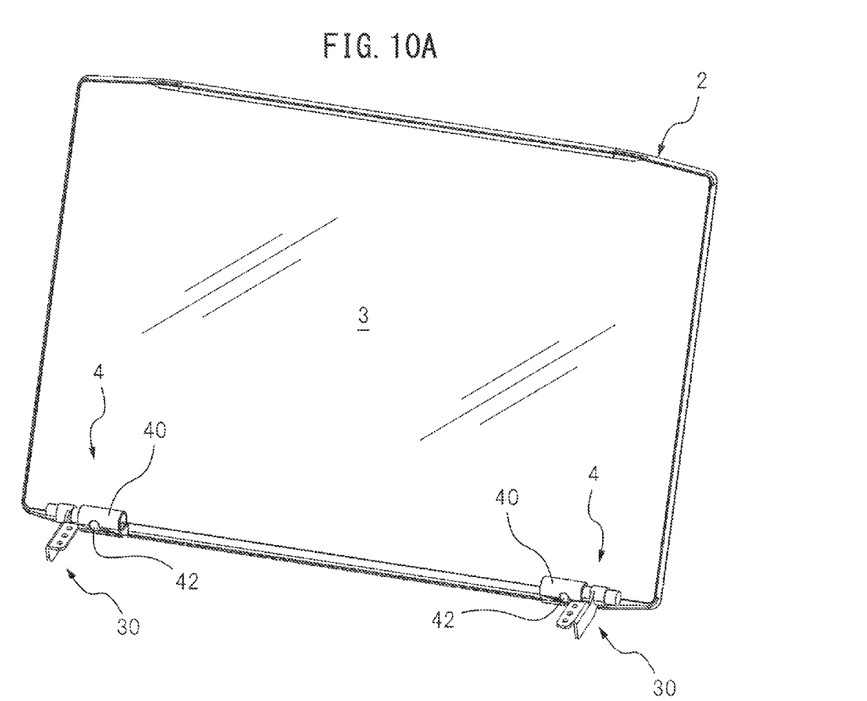
FIG. 10A is a perspective view which illustrates the appearance of the display part alone of the present application to which hinge devices and the front cover are attached.
Figure 10B:
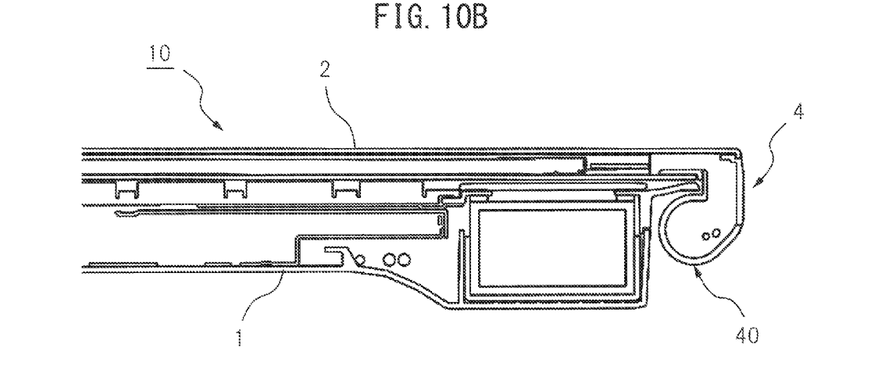
FIG. 10B is a partial cross-sectional view which illustrates the position of a hinge cover in an electronic apparatus which is provided with the hinge devices of the present application which are illustrated in FIGS. 4A and 4B.

FIG. 10A is a perspective view which illustrates the appearance of the display part 2, standing alone, which illustrates the state of the display part 2 to which the hinge devices 4 have been attached through the process of FIGS. 7A to 7C to FIGS. 9A to 9C to which, further, the hinge covers 40 and front cover 3 are attached. Further, FIG. 10B is a partial cross-sectional view which illustrates the position of a hinge cover 40 in the electronic apparatus 10 which is provided with the hinge devices 4 which are illustrated in FIGS. 4A and 4B. In this way, the display part 2 in the state with the hinge covers 40 being used to cover the hinge devices 4 can be detached from the keyboard part of the electronic apparatus. If attaching the display part 2 to the keyboard part, the hinge covers 40 are fit in the slots 15 which were explained in FIGS. 3A and 3B. Further, at the time of inspection of the display part 2, if detaching the display part 2 from the keyboard part and inserting a screwdriver into the circular holes 42 to remove the screws, the front cover 3 can be detached.

With the structure of the hinge device explained above, it is possible to remove the keyboard cover by just detaching the screws in the hinge covers. When desiring to detach a hinge cover, it is possible to detach the hinge cover by just removing the screw and sliding off the hinge cover. As a result, it is possible to maintain the disassembly ability of the electronic apparatus while realizing prevention of detachment of the hinge covers etc. The reliability of the electronic apparatus also rises. Further, the hinge covers are easy to attach to and detach from the hinge devices and will not detach at the time of use by the user. Further, using such hinge devices, it is possible to realize an electronic apparatus which is provided with pivot structures which are easy to disassemble and assemble at minimal cost.

Note that, in the embodiments which are explained above, the projecting pieces 7 which are formed at the frame 3f of the front cover 3 are provided with through holes 8, and the front cover 3 is screwed to the screw holes 9 which are provided at the housing 12 of the display part by screws 6 which are inserted into the through holes. However, the front cover 3 can be attached to the housing 12 of the display part at other locations and the projecting pieces 7 which are formed at the frame 3f of the front cover 3 can be given only the function of restricting movement of the hinge covers and the through holes 8 omitted. In this case, the front cover 3 may be provided with mounting pieces which are provided with mounting holes in addition to the projecting pieces 7 and screws which are passed through the mounting pieces may be used to screw them to the screw holes which are provided in the housing 12 of the display part 2.

Furthermore, if changing the shapes of the mounting parts of the brackets of the hinge units and the mounting parts of the hinge pivot members, the brackets can be attached to the keyboard part side and the hinge pivot members can be attached to the display part side.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A hinge device which connects a second housing which is provided with a front cover of a display to a first housing to be able to open and close, wherein the hinge device is provided with
   a bracket which is provided with a first mounting part and a rotatable holding part of a pivot, the first mounting part being fastened to an end part of one of the housings,
   a hinge pivot member which is provided with a second mounting part and a pivot, the second mounting part being fastened to an end part of the other of the housings, the pivot being held by the rotatable holding part, and
   a hinge cover which is attached to the pivot of the hinge pivot member to be able to slide in its axial direction and which covers the pivot and the rotatable holding part in a state where the pivot of the hinge pivot member is held at the rotatable holding part of the bracket,
   the hinge cover has an engagement tab which engages with the second housing to prevent the hinge cover from detaching from the pivot by the cover being slid after being attached to the pivot and a space which opens in the direction of the second housing in the engaged state of the engagement tab,
   the front cover is provided with a projecting piece which is inserted into the space if attached to the second housing when the engagement tab of the hinge cover is engaged, and
   the hinge cover is blocked from movement in the axial direction by the projecting piece in the state where the front cover is attached.

2. The hinge device according to claim 1, wherein the hinge pivot member is attached to the first housing and the bracket is attached to the second housing.

3. The hinge device according to claim 1, wherein the bracket is attached to the first housing and the hinge pivot member is attached to the second housing.

4. The hinge device according to claim 1, wherein
   the rotatable holding part of the bracket and the pivot of the hinge pivot member are provided so as to be positioned at the outside from the side surface of the first housing in the state where the second housing is closed with respect to the first housing, and
   when the second housing is opened or closed with respect to the first housing, the rotatable holding part of the bracket and the pivot of the hinge pivot member are in a state where they are concealed behind the first and second housings.

5. The hinge device according to claim 1, wherein the projecting piece is provided with a through hole and wherein the front cover is screwed by a screw which is inserted in this through hole to a screw hole which is provided at the second housing.

6. The hinge device according to claim 3, wherein the hinge cover is provided with a circular hole which passes a screw for screwing the projecting piece to the screw hole and which also passes a front end part of a screwdriver for turning the screw.

7. The hinge device according to claim 1, wherein the front cover is provided with a mounting piece to which a mounting hole is provided in addition to the projecting piece and wherein the front cover is screwed to a screw hole which is provided to the second housing by a screw which is passed through the mounting piece.

8. The hinge device according to claim 1, wherein the first housing and second housing which are connected by the hinge device are a housing of a keyboard part which is provided with input keys and a housing of a display part which is provided with a display.

9. The hinge device according to claim 8, wherein the second housing can be detached from the first housing by detaching a mounting part of the bracket to the housing or a mounting part of the hinge pivot member to the housing from the first housing.

10. An electronic apparatus which is comprised of:
    a first housing,
    a second housing which is provided with a front cover of a display, and
    a hinge device which connects the second housing to the first housing,
    the hinge device according to claim 1 being used for the hinge device.

11. The hinge device according to claim 2, wherein
    the rotatable holding part of the bracket and the pivot of the hinge pivot member are provided so as to be positioned at the outside from the side surface of the first housing in the state where the second housing is closed with respect to the first housing, and
    when the second housing is opened or closed with respect to the first housing, the rotatable holding part of the bracket and the pivot of the hinge pivot member are in a state where they are concealed behind the first and second housings.

12. The hinge device according to claim 11, wherein the projecting piece is provided with a through hole and wherein the front cover is screwed by a screw which is inserted in this through hole to a screw hole which is provided at the second housing.

13. The hinge device according to claim 12, wherein the first housing and second housing which are connected by the hinge device are a housing of a keyboard part which is provided with input keys and a housing of a display part which is provided with a display.

14. The hinge device according to claim 13, wherein the second housing can be detached from the first housing by detaching a mounting part of the bracket to the housing or a mounting part of the hinge pivot member to the housing from the first housing.

15. An electronic apparatus which is comprised of:
    a first housing,
    a second housing which is provided with a front cover of a display, and a hinge device which connects the second housing to the first housing, the hinge device according to claim 14 being used for the hinge device.

16. The hinge device according to claim 3, wherein the rotatable holding part of the bracket and the pivot of the hinge pivot member are provided so as to be positioned at the outside from the side surface of the first housing in the state where the second housing is closed with respect to the first housing, and when the second housing is opened or closed with respect to the first housing, the rotatable holding part of the bracket and the pivot of the hinge pivot member are in a state where they are concealed behind the first and second housings.

17. The hinge device according to claim 16, wherein the projecting piece is provided with a through hole and wherein the front cover is screwed by a screw which is inserted in this through hole to a screw hole which is provided at the second housing.

18. The hinge device according to claim 17, wherein the first housing and second housing which are connected by the hinge device are a housing of a keyboard part which is provided with input keys and a housing of a display part which is provided with a display.

19. The hinge device according to claim 18, wherein the second housing can be detached from the first housing by detaching a mounting part of the bracket to the housing or a mounting part of the hinge pivot member to the housing from the first housing.

20. An electronic apparatus which is comprised of:

a first housing, a second housing which is provided with a front cover of a display, and a hinge device which connects the second housing to the first housing, the hinge device according to claim 19 being used for the hinge device.

\* \* \* \* \*